US012704686B1

(12) United States Patent
Chang et al.

(10) Patent No.: US 12,704,686 B1
(45) Date of Patent: Aug. 11, 2026

(54) DUST CAP

(71) Applicant: Senko Advanced Components, Inc., Hudson, MA (US)

(72) Inventors: Jimmy Chang, Sturbridge, MA (US); Siu Kei Ma, Kowloon (HK); Kazuyoshi Takano, Tokyo (JP)

(73) Assignee: Senko Advanced Components, Inc., Hudson, MA (US)

( * ) Notice: Subject to any disclaimer, the term of this patent is extended or adjusted under 35 U.S.C. 154(b) by 330 days.

(21) Appl. No.: 18/616,738

(22) Filed: Mar. 26, 2024

Related U.S. Application Data

(60) Provisional application No. 63/492,331, filed on Mar. 27, 2023.

(51) Int. Cl.
*G02B 6/38* (2006.01)

(52) U.S. Cl.
CPC .................................. *G02B 6/3849* (2013.01)

(58) Field of Classification Search
None
See application file for complete search history.

(56) References Cited

U.S. PATENT DOCUMENTS 6,554,485 B1 * 4/2003 Beatty .................. G02B 6/3849 385/72
6,634,798 B2 * 10/2003 Cheng .................. G02B 6/3849 385/139
D572,661 S 7/2008 En Lin et al.
7,572,066 B2 8/2009 de Jong et al.
7,945,139 B2 * 5/2011 Parkman, III ....... G02B 6/3849 385/139
9,002,170 B2 4/2015 Neitge et al.
10,101,545 B2 * 10/2018 Isenhour .............. G02B 6/3827
D913,964 S 3/2021 Smith
D913,965 S 3/2021 Smith
D913,966 S 3/2021 Smith
D938,366 S 12/2021 Smith
D938,367 S 12/2021 Smith
D938,368 S 12/2021 Smith
D951,878 S 5/2022 Smith
D960,844 S 8/2022 Smith
11,874,507 B2 * 1/2024 Smith .................. G02B 6/3895
2008/0310795 A1 * 12/2008 Parkman, III ....... G02B 6/3849 385/139
2010/0074588 A1 * 3/2010 Zimmel ............... G02B 6/3849 385/139
2018/0196201 A1 * 7/2018 Chai ........................ G02B 6/36
2022/0128753 A1 * 4/2022 Ko ....................... G02B 6/4292

* cited by examiner

*Primary Examiner* — Jerry Rahll

(57) ABSTRACT

A dust cap is particularly constructed for capping an adapter of the type that receives connectors terminating two optical fibers in respective ferrules. In one instance an optical connector may be received in one end of the adapter and the dust cap may be received in another end of the adapter, opposite the connector. The dust cap is at least partially translucent or transparent, and constructed so that light passing from one ferrule of the optical connector is preferentially directed toward a first location of the dust cap and light, and light passing from the other ferrule of the optical connector is preferentially directed toward a second location of the dust cap that is spaced from the first location.

20 Claims, 18 Drawing Sheets

DUST CAP

RELATED APPLICATIONS

This application claims priority to U.S. Patent Application 63/492,331 filed Mar. 27, 2023 and titled "Dust Cap", which is fully incorporated by reference into the present application.

BACKGROUND

Demand for bandwidth by enterprises and individual consumers continues to experience exponential growth. To meet this demand efficiently and economically, data centers have to achieve ultra-high density cabling with low loss budgets. Fiber optics have become the standard cabling medium used by data centers to meet the growing needs for data volume and transmission speeds, There remains a need for multi-fiber, fiber optic connectors with proper protection against debris or dust. It is desirable to be able to recognize which among a great multitude of dust caps is the particular one associated with the optical connection which is to be addressed by a technician.

SUMMARY

A dust cap for use in an adapter configured to receive and connect fiber optic connectors having two single fiber ferrules generally comprises an insertion body sized and shaped for being received in a port of the adapter so as to substantially fill the port at a location for blocking ingress of debris and dust into the port. The insertion body includes a front portion having a receptacle sized and shaped to be simultaneously aligned with the two ferrules and a back portion including a top wall, a bottom wall a first side wall and a second side wall. A cavity in the insertion body extending rearward from the receptacle is constructed to preferentially direct light from a first one of the ferrules toward a first external surface of the dust cap and light from a second one of the ferrules toward a second external surface located away from the first external surface. A pull tab connected to the back portion of the insertion body can be used in pulling the insertion body from the adapter port.

Other objects and features of the present invention will be in part apparent and in part pointed out hereinafter.

BRIEF DESCRIPTION OF THE FIGURES

Corresponding reference characters indicate corresponding parts throughout the several views of the drawings.

DETAILED DESCRIPTION

Figure 1:
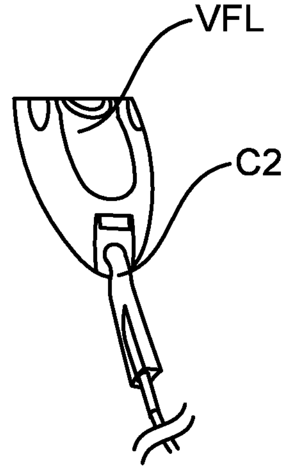
FIG. 1 is a schematic perspective of a visual fault locator being used to test one connection of an adapter having dust caps.
Figure 1:
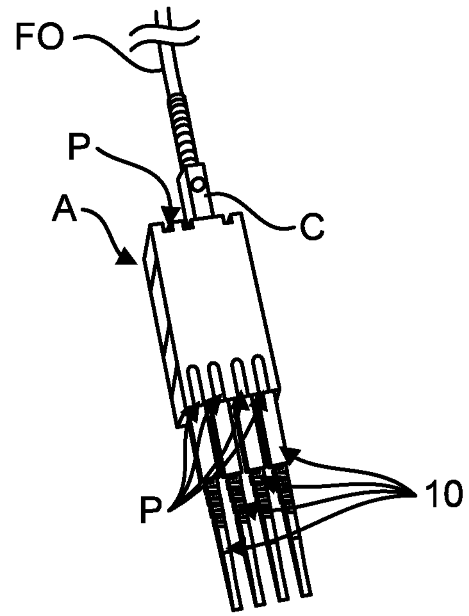
Figure 2:
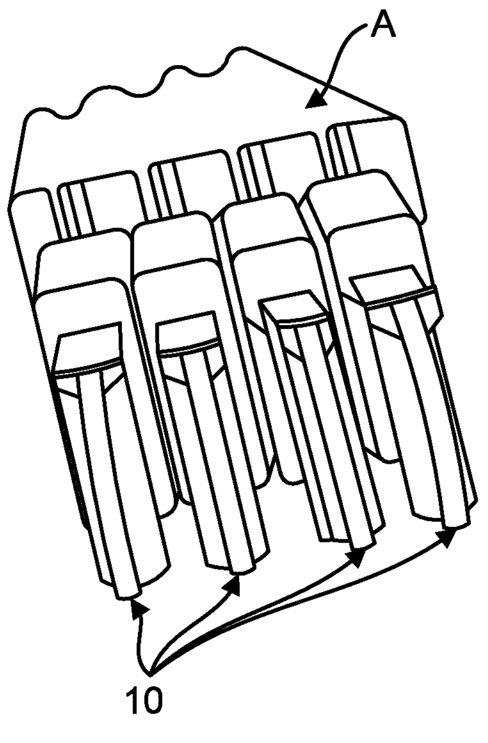
FIG. 2 is an end view of an adapter with dust caps and showing one of the dust caps illuminated.
Figure 3:
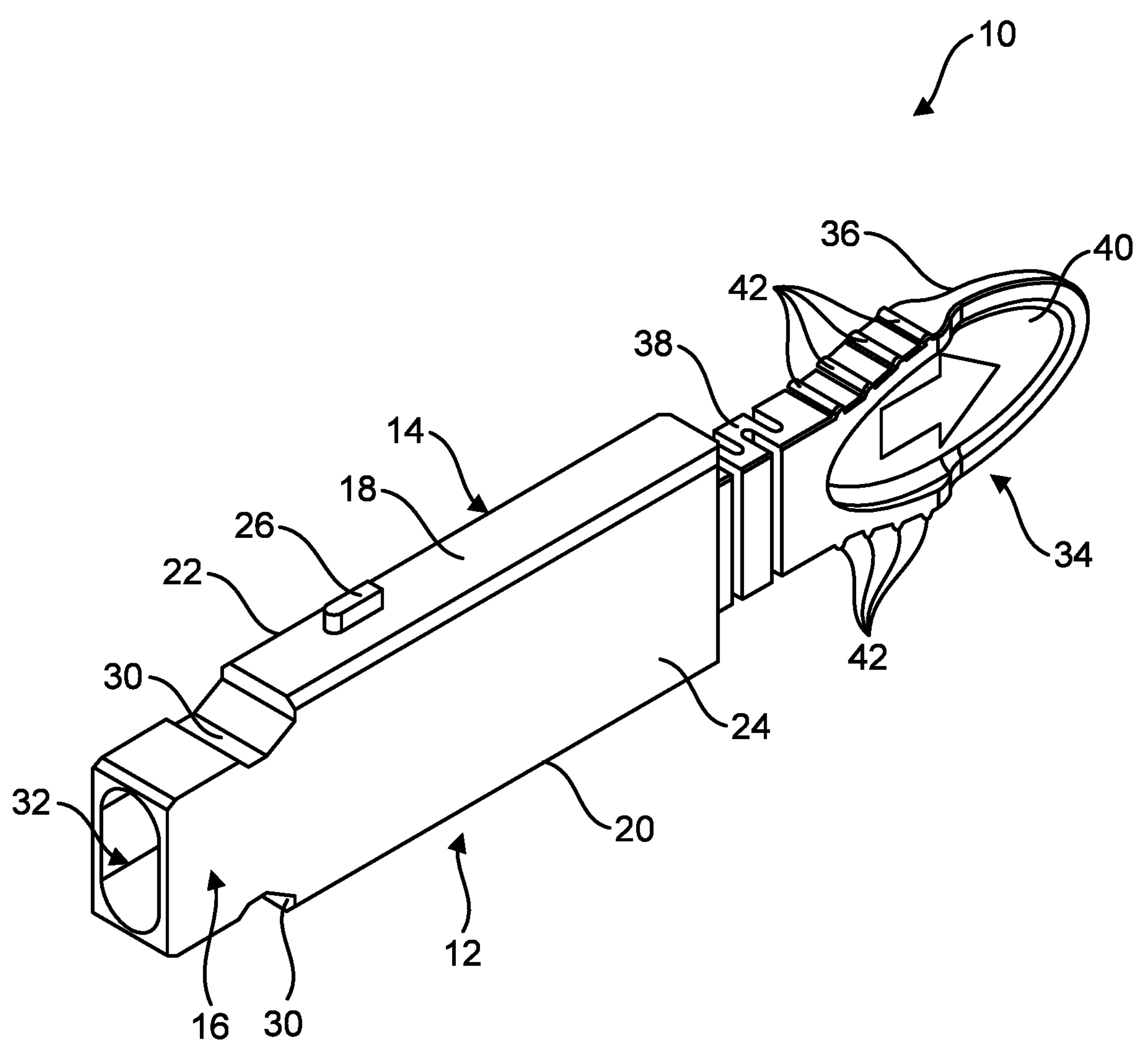
FIG. 3 is a perspective of a first version of a dust cap.
Figure 4:
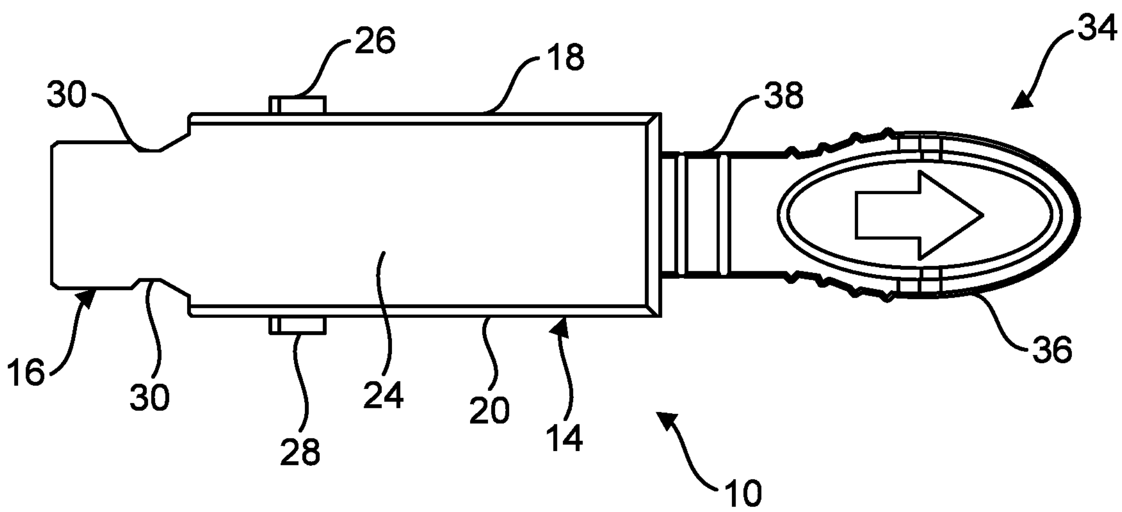
FIG. 4 is a side elevation thereof.
Figure 5:
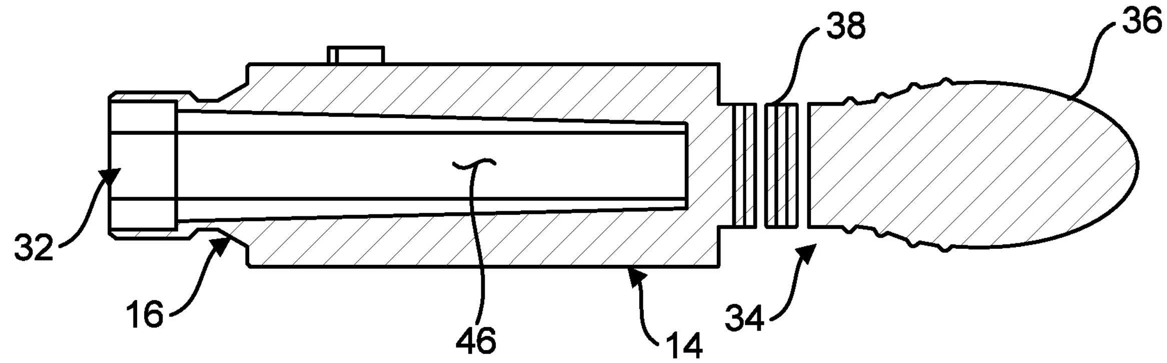
FIG. 5 is a longitudinal section thereof.
Figure 6:
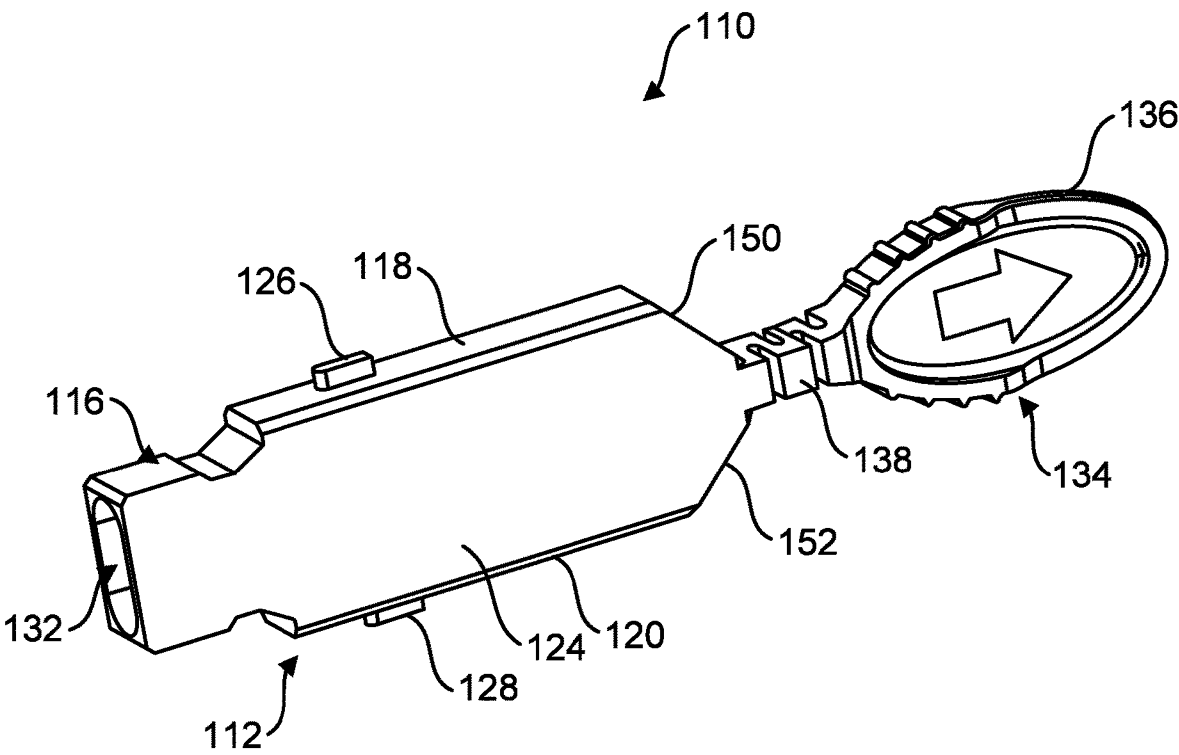
FIG. 6 is a perspective of a second version of the dust cap.
Figure 7:
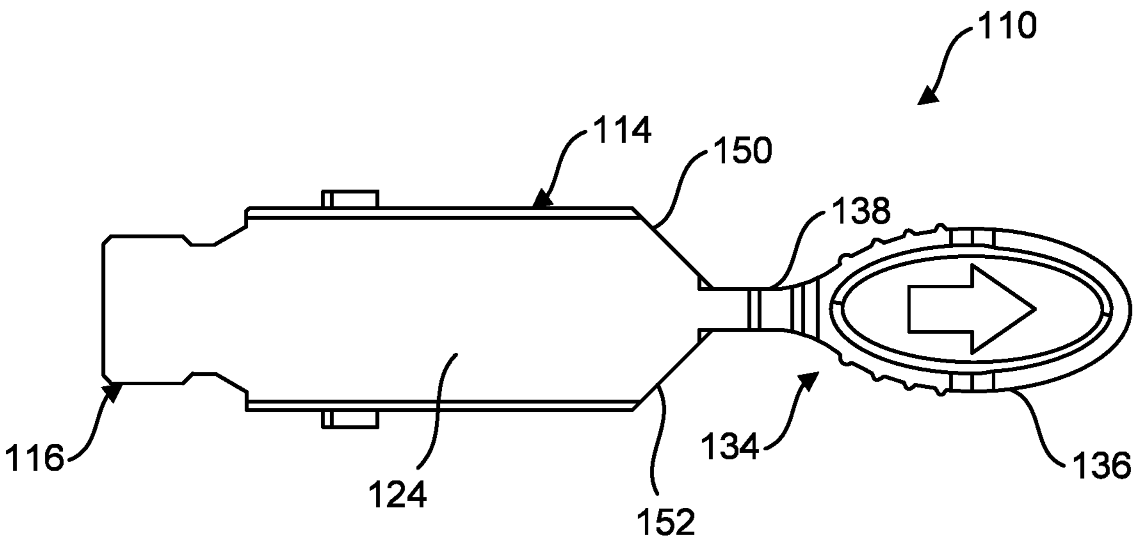
FIG. 7 is a side elevation thereof.

Referring now to the drawings and in particular to FIGS. 3-5, a dust cap constructed according to the principles of the present invention is generally indicated at 10 and shown to comprise an insertion body 12 sized and shaped for insertion into a port P of an adapter A (see FIGS. 1 and 2). The insertion body 12 has a back portion 14 and a front portion 16. The back portion 14 of the insertion body 12 is sized and shaped to be received in a substantially fill one of the ports P in the adapter A, at least at one location. This construction permits the dust cap 10 to prevent dust and debris from entering into the adapter port P. The back portion 14 includes a top wall 18, a bottom wall 20, a first side wall 22 and a second side wall 24. The first and second side walls 22, 24 have a height and the top and bottom walls 18, 20 have a width. The height of the first and second side walls 22, 24 is greater than the width of the top wall and bottom wall. The top wall 18 has a first key 26 and the bottom wall 20 has a second key 28. The insertion body 12 mimics the shape of an SN® fiber optic connector C, and in that regard the front portion 16 of the insertion body includes recesses 30 on the top and bottom walls that receive latch arms (not shown) located inside the adapter A. The latch arms releasably secure the dust cap 10 in the adapter A. SN® connectors and adapters are available from Senko Advanced Components, Inc. of Hudson, Massachusetts. The forward end of the front portion 16 has a lesser height than the back portion 14, and further includes a receptacle 32. As illustrated, the receptacle 32 is a single opening that is sized and shaped to be simultaneously aligned with two optical fiber ferrules to receive light along a longitudinal axis into the dust cap 10 and into the receptacle. It will be understood that the receptacle 32 may be formed from more than one opening within the scope of the present invention. For example, there may be multiple partitions within the adapter dividing the opening up into distinct ports separated from each other by the partitions.

The dust cap 10 further includes a pull tab 34 extending rearwardly from a rearward end of the insertion body 12. The pull tab 34 includes a roughly elliptical fiber grip portion 36 and a bendable portion 38 connecting the finger grip portion to the insertion body 12. The bendable portion 38 is made up of a series of turnbacks, which have the effect of creating a zone of weakness that allows the pull tab 34 to bend in the bendable portion with respect to the insertion body 12 about a vertical axis. In other words, the pull tab 34 can be resiliently moved from side-to-side with respect to the insertion body 12. The grip portion 36 has a shallow depression 40 with a mostly flat bottom (except for a raised arrow in the flat bottom). The same depression (not shown) is present on both sides of the grip portion 36. The depressions 40 provide an area for the ends of the thumb and pointer finger to grip the grip portion 36 by engaging respective ones of the depressions. The recessed configuration of the depressions 40 provides for additional gripping force when pulling the dust cap 10 outwardly in the direction indicated by the arrows. Top and bottom surfaces of the grip portion 36 are provided with ribs 42. The ribs increase the gripping force in the instance where the pull tab 34 is gripped with opposing fingers engaging top and bottom surfaces of the grip portion 36, rather than in the depressions 40. The forward and downward slope of the grip portion 36 in the location where the ribs 42 are present also improves gripping force in that situation.

The height of the pull tab 34, and in particular, the height of the bendable portion 38 is less than the height of the back portion 14 of the insertion body 12. This construction leaves parts of the back portion 14 facing rearwardly exposed along a line of sight past the pull tab 34. The utility of being able to view these rearward facing parts will be explained hereinafter. In the illustrated versions of the dust cap 10, the insertion body 12 and pull tab 34 are formed as a single piece of material. However, it will be understood that parts of the dust cap 10 could be formed separately and connected together within the scope of the present invention. Moreover, the material of the dust cap 10 (and that of all the versions of dust caps described hereinafter) is preferably translucent so that light that enters the dust cap from an optical connector opposing the dust cap in the adapter A may be seen from a vantage rearward of the dust cap. It will be understood that only part of the dust cap may be made transparent or translucent within the scope of the present invention.

Referring now particularly to FIG. 5, the interior of the dust cap 10 includes a cavity 46 that extends from the opening 32 in the front end of the front portion 16 of the insertion body 12 to a point just short of the rear end of the insertion body. Preferably, a distance through the material of the dust cap 10 from a closed or rear end of the cavity is less than or equal to about 1 mm. The cavity 46 tapers in a height dimension as it extends from adjacent the opening 32 rearwardly toward the rear end of the back portion 14 of the insertion body 12.

As shown in FIG. 1, the adapter A includes four ports P, each of which is plugged by one of the dust caps 10. The opposite side of the adapter A has four corresponding ports P. A standard SN® optical connector is plugged into one of the ports P in FIG. 1. The optical connector C is of the type having two LC, single fiber ferrules, as is known in the art. The light emitted from the ends of the fibers of the first optical connector C pass into the cavity 46 of the dust cap 10 and impinge upon the rearward end of the cavity. Because the material of the dust cap 10 is translucent, the dust cap glows as schematically illustrated in FIGS. 1 and 3. This allows a technician to quickly identify a particular dust cap 10. FIG. 2 shows the adapter A and dust caps 10 from a rear end on vantage. Again, the glow of the dust cap 10 connected to an active optical connection can be easily seen as compared to the other dust caps. The SN® connector C is plugged into one of the four corresponding ports P, the others being left open for purposes of illustration. The optical connector C is attached to a fiber optic cable FO having a second SN® optical connector C2 terminating the opposite end of the cable. The second optical connector C2 is plugged into a visual fault locator (or "VFL").

The VFL provides a laser light source to the fiber optic cable FO and to the first optical connector C plugged into the adapter A. The use of the VFL in FIG. 1 is for illustrative purposes. The source of light can be the source provided for fiber optic communication. However, in some instances the dust cap 10 can be used in combination with the VFL to provide an indication of a fault in an optical fiber. This can be determined by observing the dust cap 10 to see whether the dust cap is glowing more brightly at the rear end of the insertion body 12 nearer the top wall or nearer to the bottom wall. The one glowing less brightly is indicative of a fault with the cable FO and/or connector C, C2. If there is a fault in one of the fibers, it would deliver no light to the dust cap 10. However, some diffusion from the other fiber may result in at least some light emanating from the wall nearest the faulty optical fiber.

Figure 8:
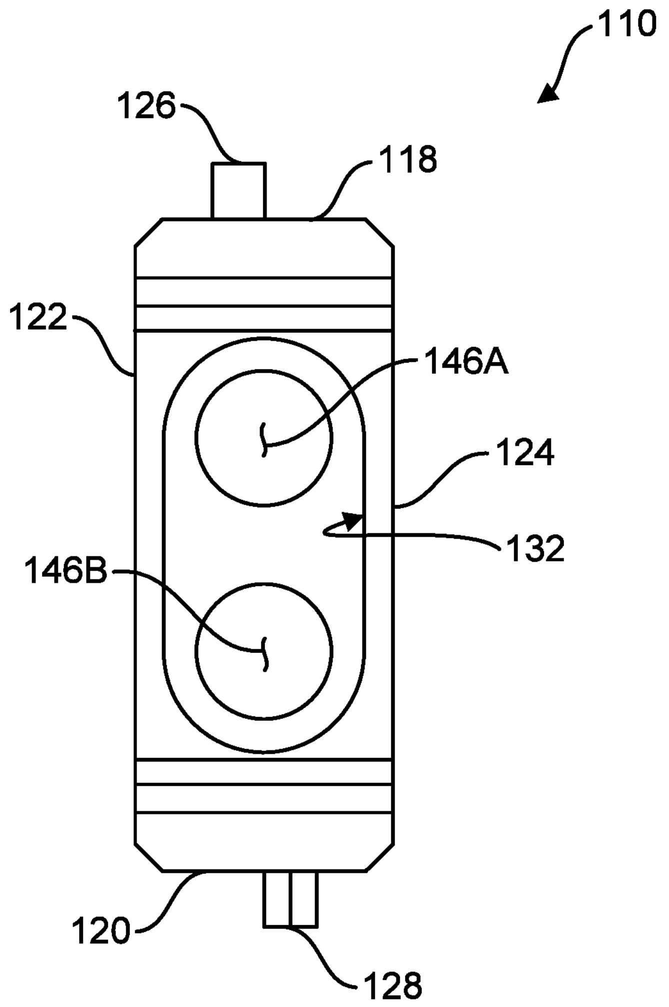
FIG. 8 is a front end view thereof.

A second version of a dust cap 110 is shown in FIGS. 6-9. The second version of the dust cap 110 is similar to the dust cap 10 of the first version. Accordingly, corresponding parts will be designated with the same reference numerals, plus "100." Moreover, parts which are substantially identical will not be described again, but reference to the part in the dust cap 10 of the first version having the corresponding reference numeral can be used to locate a textual description. It is noted in regard to first and second keys 126, 128 on the top wall 118 and the bottom wall 120 that as seen in FIG. 8, they are offset laterally from a center plane of the dust cap 110. Moreover, the keys 126, 128 are relatively narrow. Regardless of whether the top wall 118 or bottom wall 120 is up, the dust cap 110 has the same appearance and can be received in polarity slots in the adapter A. The keys 126, 128 serve to align the dust cap 110 with one port of the adapter A. The first and second keys 26, 28 of the dust cap 10 of the first version are similarly symmetrically offset and perform in the same way.

One difference between the second version of the dust cap 110 from the first version of the dust cap 10 on their exteriors is the configuration of a rear end of the insertion body 112. Instead of being squared off as with the dust cap 10 of the first version, the rear end of the insertion body 112 of the dust cap 110 angles inwardly to an intersection with the bendable portion 138 of the pull tab 134. Although the bendable portion 138 has the same shape as the bendable portion 38, the bendable portion 138 is shorter in height than the bendable portion 38. As a result, there are relatively long sloping rear walls 150, 152 for the rear end of the back portion 114 of the insertion body 112.

Figure 9:
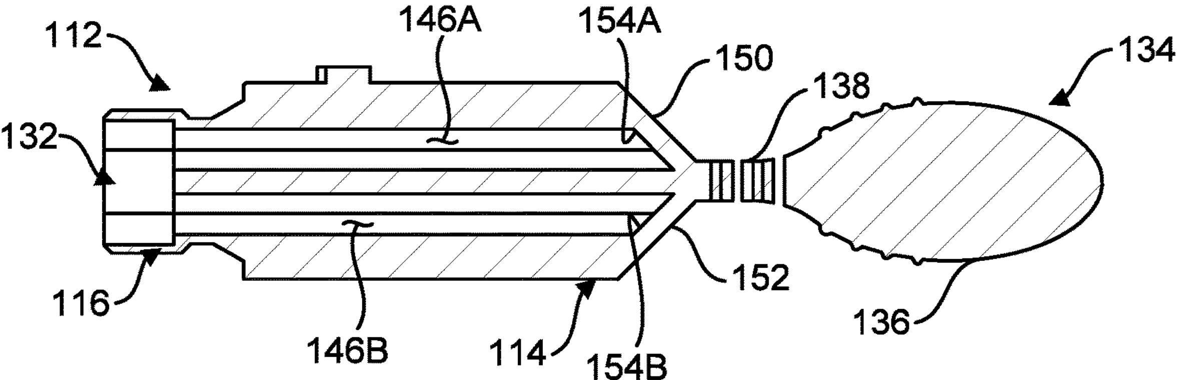
FIG. 9 is a longitudinal section thereof.

Referring now to FIG. 9, another difference between the dust cap 110 of the second version and the dust cap 10 of the first version may be seen. Instead of a single open cavity 46 extending rearward from the opening 32 in the dust cap 10, there are two separate channels 146A, 146B formed into the material of the interior of the dust cap 110. As may be seen in FIG. 8, the channels 146A, 146B each have a circular cross section. The channels 146A, 146B are positioned so that light leaving a respective one of the two ferrules of an opposite SN® connector C shine directly into a respective one of the channels 146A, 146B. A closed, rear end 154A, 154B of each channel 146A, 146B is formed at an angle that is skew to a longitudinal axis of the channel. In particular, the rear end 154A, 154B is angled so that it is parallel to the angle that is made by the adjacent rear wall 150, 152. The angulation of the rear end 154A, 154B of the channel 146A, 146B is believed to preferentially direct light from the channel toward the nearest rear wall 150, 152. The separation by the material of the dust cap 110 of the rear end 154A, 154B of the channel 146A, 146B and the nearest adjacent rear wall 150, 152 of the back portion 114 is preferably about 1 mm or less. It is believed that this construction further distinguishes light that is seen through the translucent material of the dust cap 110 so that if no light is being transported by one of the two optical fibers of the SN® connector C, then one of the rear walls 150, 152 will not glow as brightly as the other. This provides a better indication to the technician as to which optical fiber is not transmitting light is not transmitting light.

Figure 10:
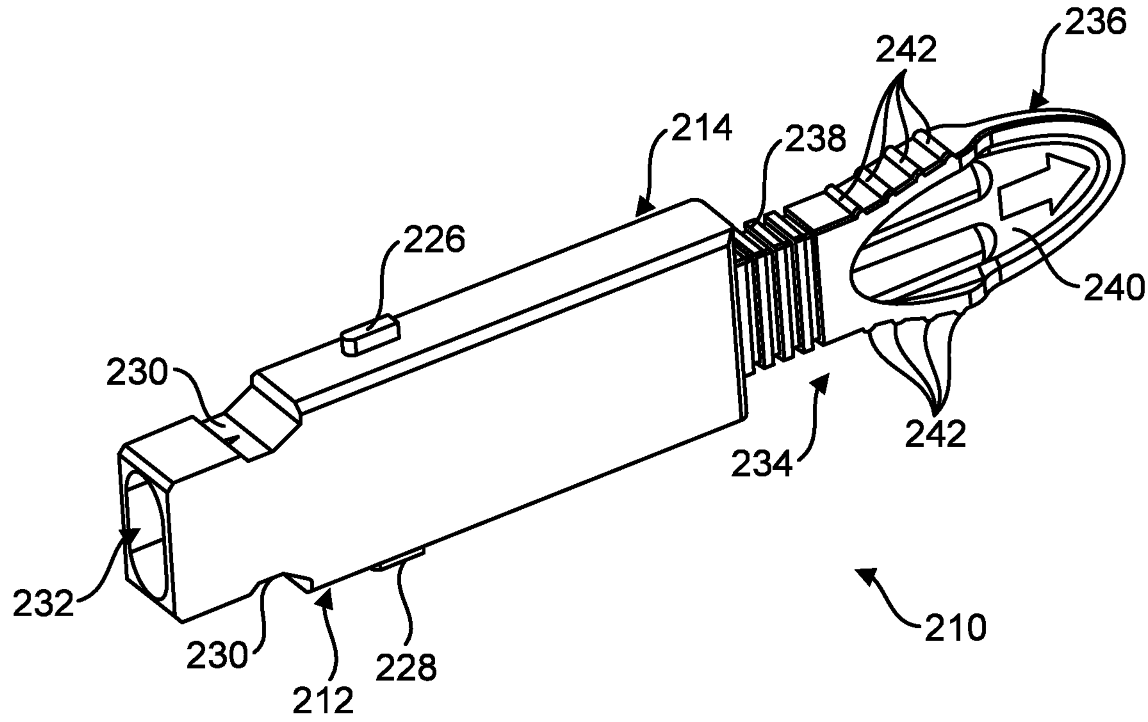
FIG. 10 is a perspective of the third version of a dust cap.
Figure 11:
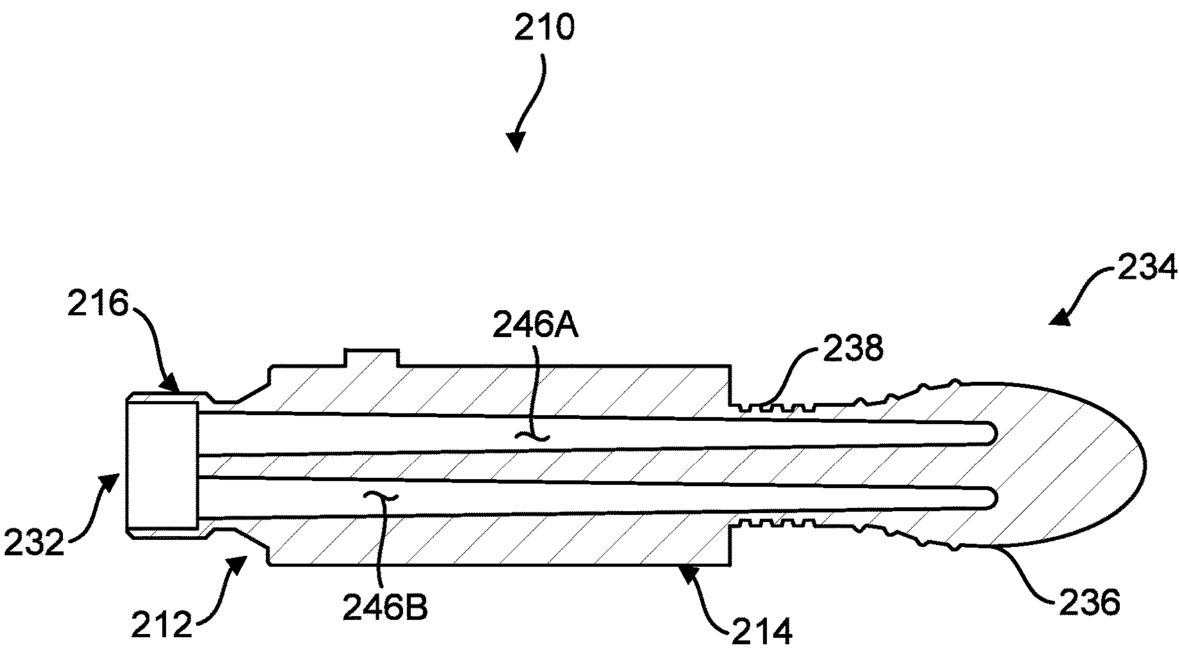
FIG. 11 is a longitudinal section thereof.

A dust cap 210 of a third version is illustrated in FIGS. 10 and 11. The third version of the dust cap 210 is similar to the dust cap 10 of the first version. Accordingly, corresponding parts will be designated with the same reference numerals, plus "200." Moreover, parts which are substantially identical will not be described again, but reference to the part referenced by the corresponding reference numeral in the dust cap 10 of the first version can be used to locate a textual description. The dust cap 210 of the third version has a shape at its rear end which is essentially the same as for the dust cap 10 of the first version.

A bendable portion 238 of the dust cap 210 does not have turnbacks, but rather is a continuous piece from the rear end of the back portion 214 of the insertion body 212 rearwardly to its intersection with the grip portion 236. The bendable portion 238 has ribs on its exterior. This construction is better understood by reference to the section view of FIG. 11. Similar to the dust cap 110 of the second version, the dust cap 210 has two distinct channels 246A, 246B that extend rearwardly from the opening 232 in the front portion 216 of the insertion body 212. However, unlike the dust cap 110, these channels 246A, 246B extend through the rear end of the back portion 214, through the bendable portion 238 of the pull tab 234 and into the grip portion 236. More specifically, the channels 246A, 246B terminate in the depressions 240 of the grip portion 236. As can be seen in FIG. 10, the exterior contour of the channels 246A, 246B can be seen in the depression 240 of the grip portion 236 of the pull tab 234. Extending the channels 246A, 246B further back into the pull tab 234 helps to be able to see the light glowing from the particular dust cap 210, particularly when it is crowded together with other dust caps from many adapters placed close together in a rack or the like.

Figure 12:
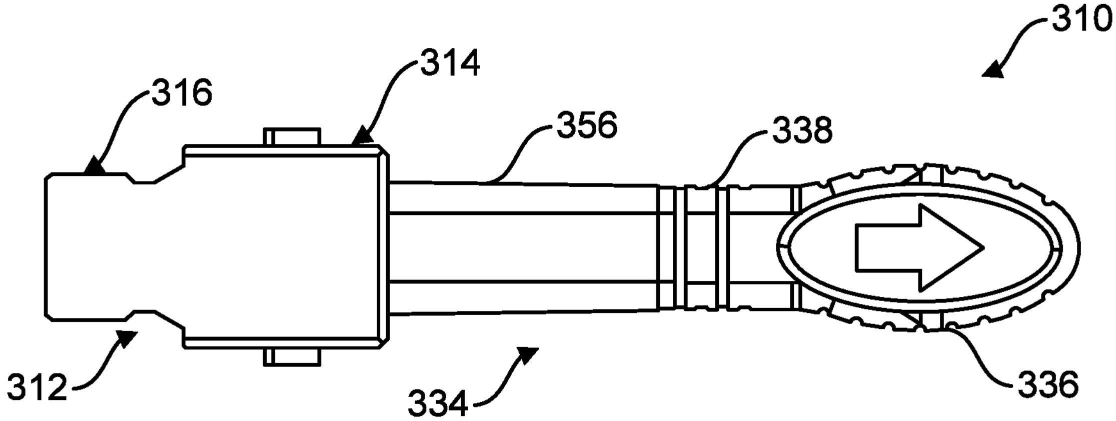
FIG. 12 is a side elevation of a fourth version of a dust cap.
Figure 13:
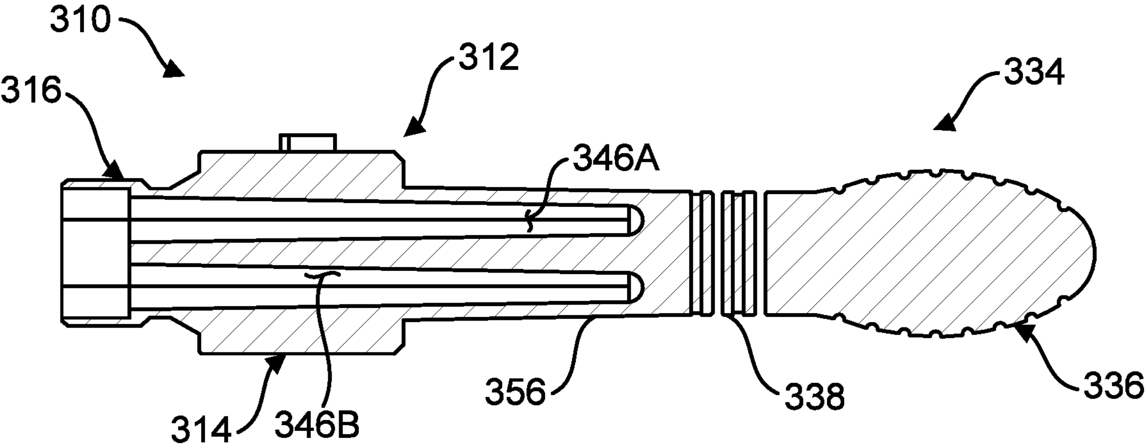
FIG. 13 is a longitudinal section thereof.

Referring now to FIGS. 12 and 13, a dust cap 310 of a fourth version is shown. The fourth version of the dust cap 310 is similar to the dust cap 10 of the first version. Accordingly, corresponding parts will be designated with the same reference numerals, plus "300." Moreover, parts which are substantially identical will not be described again, but reference to the part referenced by the corresponding reference numeral in the dust cap 10 of the first version can be used to locate a textual description. The dust cap 310 has a back portion 314 of the insertion body 312 that is shorter in length than the other versions. The pull tab 334 is elongated, including an extension portion 356 between the rear end of the back portion 314 and the bendable portion 338 of the pull tab. The interior of the dust cap 310 has two channels 346A, 346B similar to the dust cap 210 of the third version. These channels 346A, 346B extend into the extension portion 356 of the pull tab 334, terminating just short of the bendable portion 338.

Figure 14:
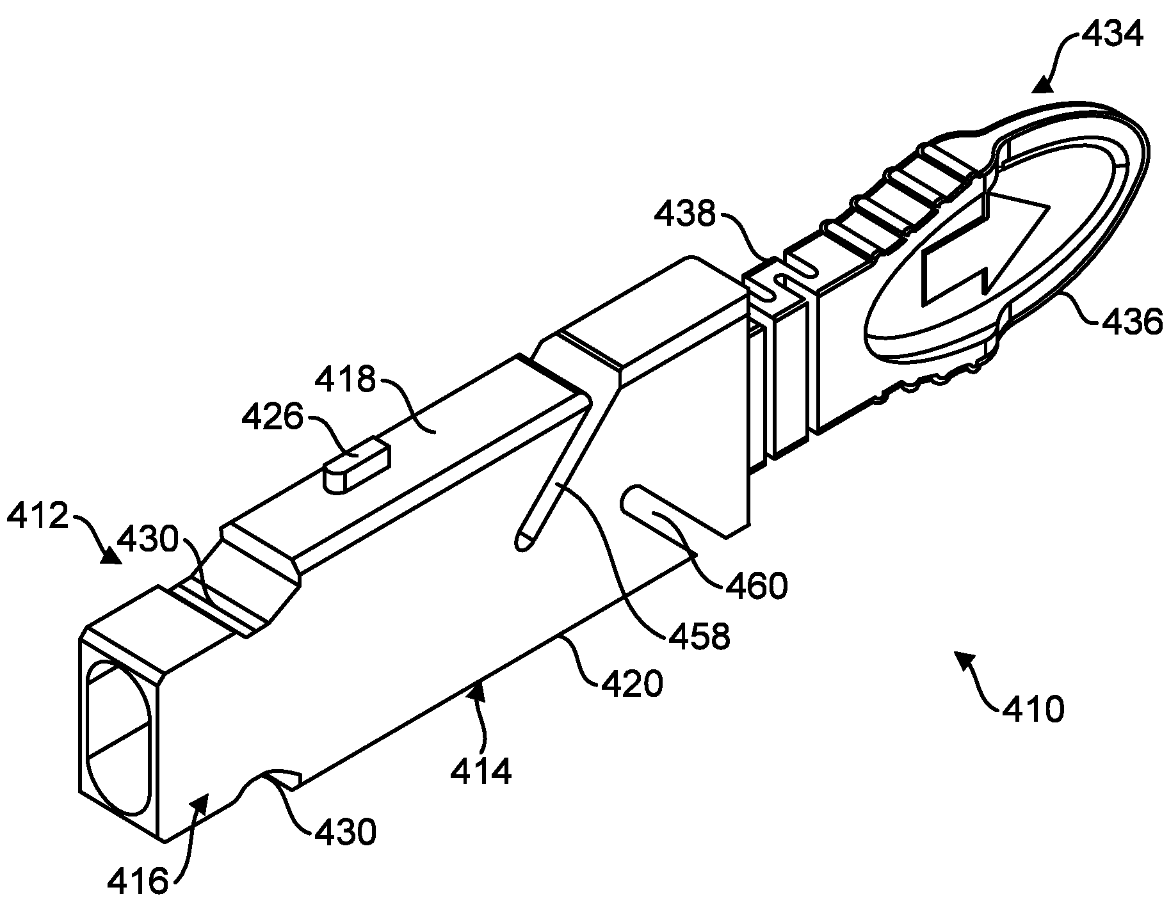
FIG. 14 is a perspective of a fifth version of the dust cap.
Figure 15:
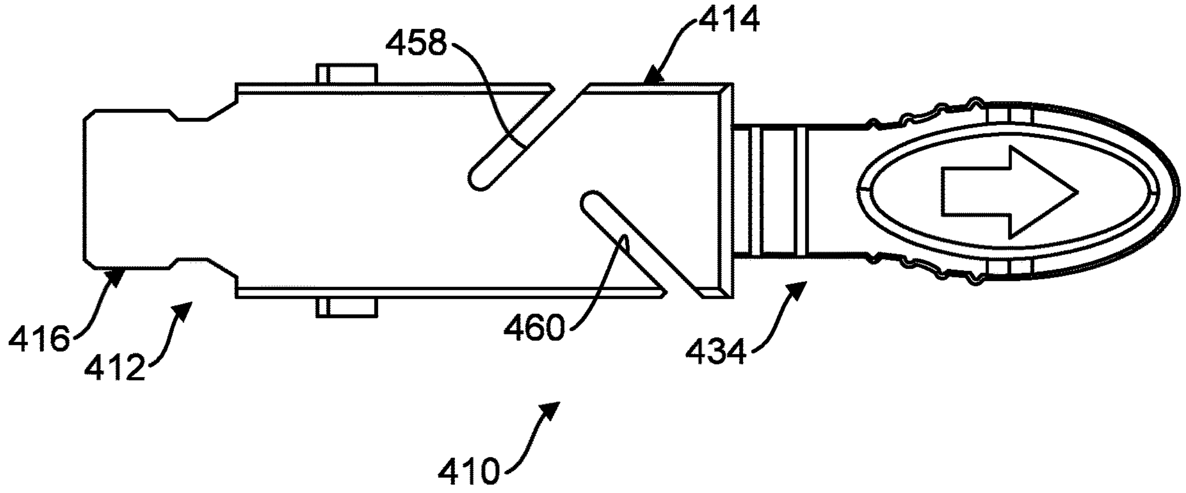
FIG. 15 a side elevation thereof.
Figure 16:
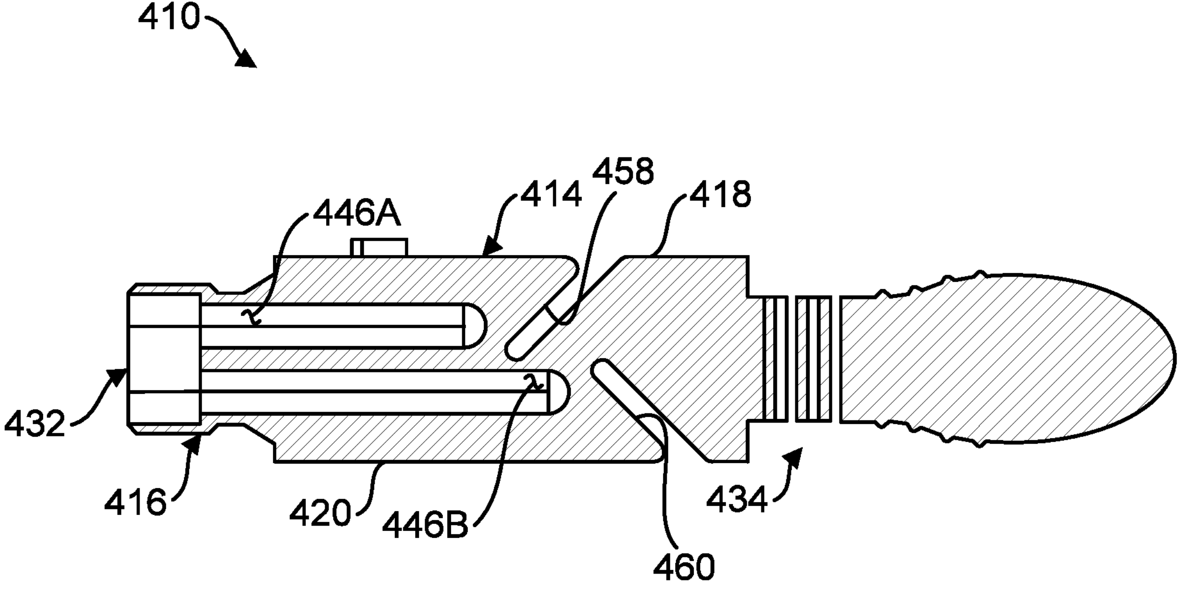
FIG. 16 is a longitudinal section thereof.

A dust cap 410 of a fifth version is shown in FIGS. 14-16. The fifth version of the dust cap 410 is similar to the dust cap 10 of the first version. Accordingly, corresponding parts will be designated with the same reference numerals, plus "400." Moreover, parts which are substantially identical will not be described again, but reference to the part referenced by the corresponding reference numeral in the dust cap 10 of the first version can be used to locate a textual description. The fifth version of the dust cap 410 includes a top slot 458 extending downward at an angle into the back portion 414 of the insertion body 412 from the top wall 418, and a bottom slot 460 extending upward at an angle into the back portion from the bottom wall 420. Each of the first and second slots 458, 460 angles forwardly from the respective top and bottom wall 418, 420.

The interior of the dust cap includes two channels 446A, 446B, extending rearward from the opening 432 in the front portion 416 in a manner similar to the dust caps 110, 210, 310 of versions two through four. However, in the case of the dust cap 410, a first of the channels 446A has a length which is less than the length of a second of the channels 446B. As shown in FIG. 16, the first channel 446A stops just short of intersecting the first slot 458. The second channel 446B extend past the rear end of the first channel 446A and the inner end of the first slot 458 to a position just short of the second slot 460. The first and second slots 458, 460 are believed to enhance the light transmission at these locations so that a distinction between the light from the first channel 446A from that of the second channel 446B can be made by seeing whether the top wall 418 or bottom wall 420 is glowing more brightly. Further, the location of the glow in the top wall 418 should be offset from the location of the glow from the bottom wall 420 to further assist in distinction.

Figure 17:
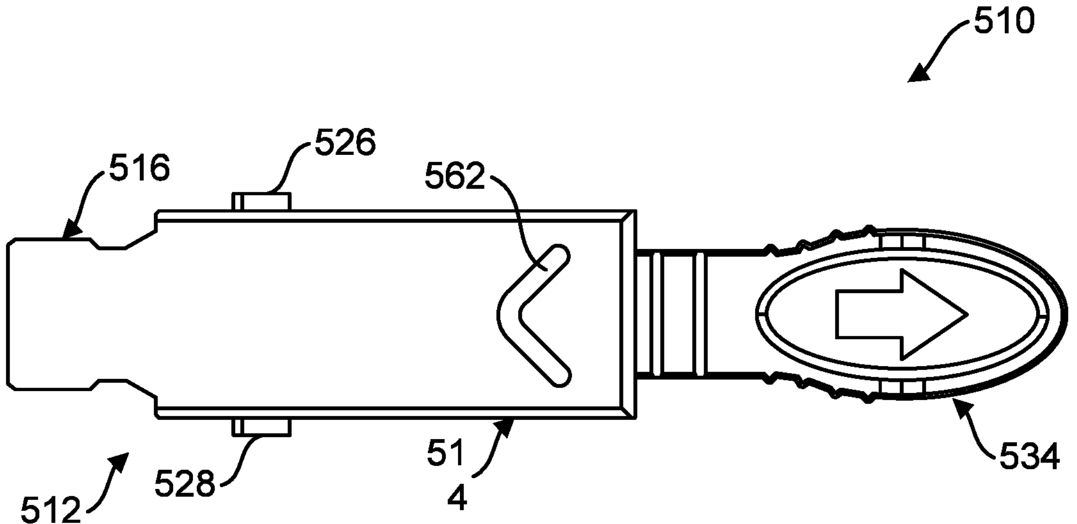
FIG. 17 is a side elevation of a sixth version of the dust cap.
Figure 18:
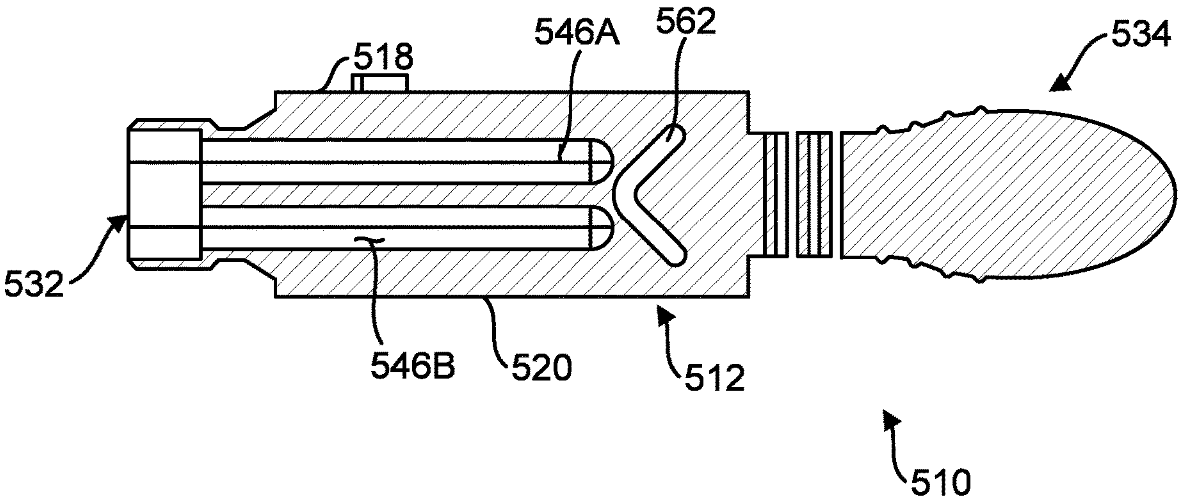
FIG. 18 is a longitudinal section thereof.

A dust cap 510 of a sixth version is shown in FIGS. 17 and 18. The sixth version of the dust cap 510 is similar to the dust cap 10 of the first version. Accordingly, corresponding parts will be designated with the same reference numerals, plus "500." Moreover, parts which are substantially identical will not be described again, but reference to the part referenced by the corresponding reference numeral in the dust cap 10 of the first version can be used to locate a textual description. The dust cap 510 of the sixth version is similar to the dust cap 410 of the fifth version in that a slot 562 through the back portion 514 of the insertion body 512 is provided to direct light from a first channel 546A and a second channel 546B to different locations on the insertion body. More specifically, a single V-shaped slot 562 extends completely through the back portion 514. The slot 562 is entirely confined within the boundaries of the back portion 514 of the insertion body 512. The first and second channels 546A, 546B each have the same length. The first channel 546A terminates just short of and slightly above the point of the "V" formed by the slot 562. The point of the "V" corresponds to the forwardmost extent of the slot 562. The second channel 546B terminates just short of and slightly below the point of the "V" of the slot 562. This construction is believed to preferentially direct light from the first channel 546A toward the top wall 518 and direct light from the second channel 546B toward the bottom wall 520. The top wall 518 glowing more brightly than the bottom wall 520, for example, can be used to determine that there is a fault in the optical fiber associated with the bottom wall.

As used herein, the term "optical fiber" is intended to apply to all types of single mode and multi-mode light waveguides, including one or more bare optical fibers, coated optical fibers, loose-tube optical fibers, tight-buffered optical fibers, ribbonized optical fibers, bend performance optical fibers, bend insensitive optical fibers, nanostructured optical fibers or any other expedient for transmitting light signals. A multi-fiber optic cable includes a plurality of the optical fibers. Such cables have a variety of names depending on their particular usage, and may be considered as "trunk cables" or "trunks" when connected to fiber optic modules used to form connections to jumper cables using a select polarity.

For connection of cables together or with other fiber optic devices, the terminal ends of a cable may include a connector. A connector may include a housing structure configured to interact with and connect with an adapter. An adapter may include two or more aligned ports for aligning fiber optic connectors therein to align and connect optical fibers endto-end. As described herein, the connectors and adapters may be considered multi-fiber connectors and multi-fiber adapters.

Various parts, components or configurations described with respect to any one embodiment or version above may also be adapted to any others of the embodiments or versions provided.

The present disclosure is not to be limited in terms of the particular embodiments or version described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A dust cap for use in an adapter configured to receive and connect fiber optic connectors having two single fiber ferrules, the dust cap comprising:

an insertion body sized and shaped for being received in a port of the adapter so as to substantially fill the port at a location for blocking ingress of debris and dust into the port, the insertion body including a front portion having a receptacle sized and shaped to be simultaneously aligned with the two ferrules and a back portion including a top wall, a bottom wall a first side wall and a second side wall, a cavity in the insertion body extending rearward from the receptacle and constructed to preferentially direct light from a first one of the ferrules toward a first external surface of the dust cap and light from a second one of the ferrules toward a second external surface located away from the first external surface;

a pull tab connected to the back portion of the insertion body for use in pulling the insertion body from the adapter port.

2. The dust cap as set forth in claim 1 wherein the top wall and the bottom wall have a width and the first and second side walls have a height that is greater than the width.

3. The dust cap as set forth in claim 2 further comprising a key located one of the top wall and the bottom wall and positioned for engaging the adapter upon insertion of the insertion body into the adapter.

4. The dust cap as set forth in claim 1 wherein the front portion of the insertion body has a recess located to receive a latch arm of the adapter for securing the dust cap in the adapter.

5. The dust cap as set forth in claim 4 wherein the front portion of the insertion body has another recess located to receive a latch arm of the adapter for securing the dust cap in the adapter.

6. The dust cap of claim 1 wherein the cavity has a rearwardmost end, the rearwardmost end being separated from an exterior surface of the dust cap by material that is 1 mm or less thick.

7. The dust cap as set forth in claim 1 wherein the pull tab comprises a bendable portion and a grip portion.

8. The dust cap as set forth in claim 1 wherein the cavity has a closed end that is skew to a longitudinal axis of the cavity.

9. The dust cap as set forth in claim 8 wherein the back portion of the insertion body has a rear end extending at an angle to the longitudinal axis of the cavity.

10. The dust cap as set forth in claim 9 wherein the closed end of the cavity and the rear end of the insertion body are parallel to each other.

11. The dust cap as set forth in claim 1 wherein the cavity extends into the pull tab.

12. The dust cap as set forth in claim 1 wherein the cavity comprises a first channel and a second channel separated from each other in the dust cap.

13. The dust cap as set forth in claim 1 further comprising a slot in the insertion body.

14. The dust cap as set forth in claim 13 wherein the slot is located in the back portion of the insertion body.

15. The dust cap as set forth in claim 14 wherein the slot constitutes a first slot, the dust cap further comprising a second slot in the back portion of the insertion body.

16. The dust cap as set forth in claim 15 wherein the cavity comprises a first channel and a second channel, the first channel having a closed end nearer to the first slot than the second slot and the second channel having a closed end nearer to the second slot than the first slot.

17. The dust cap as set forth in claim 16 wherein first channel is shorter than the second channel.

18. The dust cap as set forth in claim 15 wherein the first slot extends from the top wall into the insertion body at an angle, and the second slot extends from the bottom wall into the insertion body at an angle.

19. The dust cap as set forth in claim 14 wherein the slot is entirely bounded by the back portion of the insertion body.

20. The dust cap as set forth in claim 19 wherein the slot is V-shaped.

* * * * *